Jan. 10, 1956   J. M. CHRISTMAN   2,730,019
MACHINE FOR CHAMFERING GEARS AND CLUTCH MEANS THEREOF
Filed June 20, 1951   3 Sheets-Sheet 1
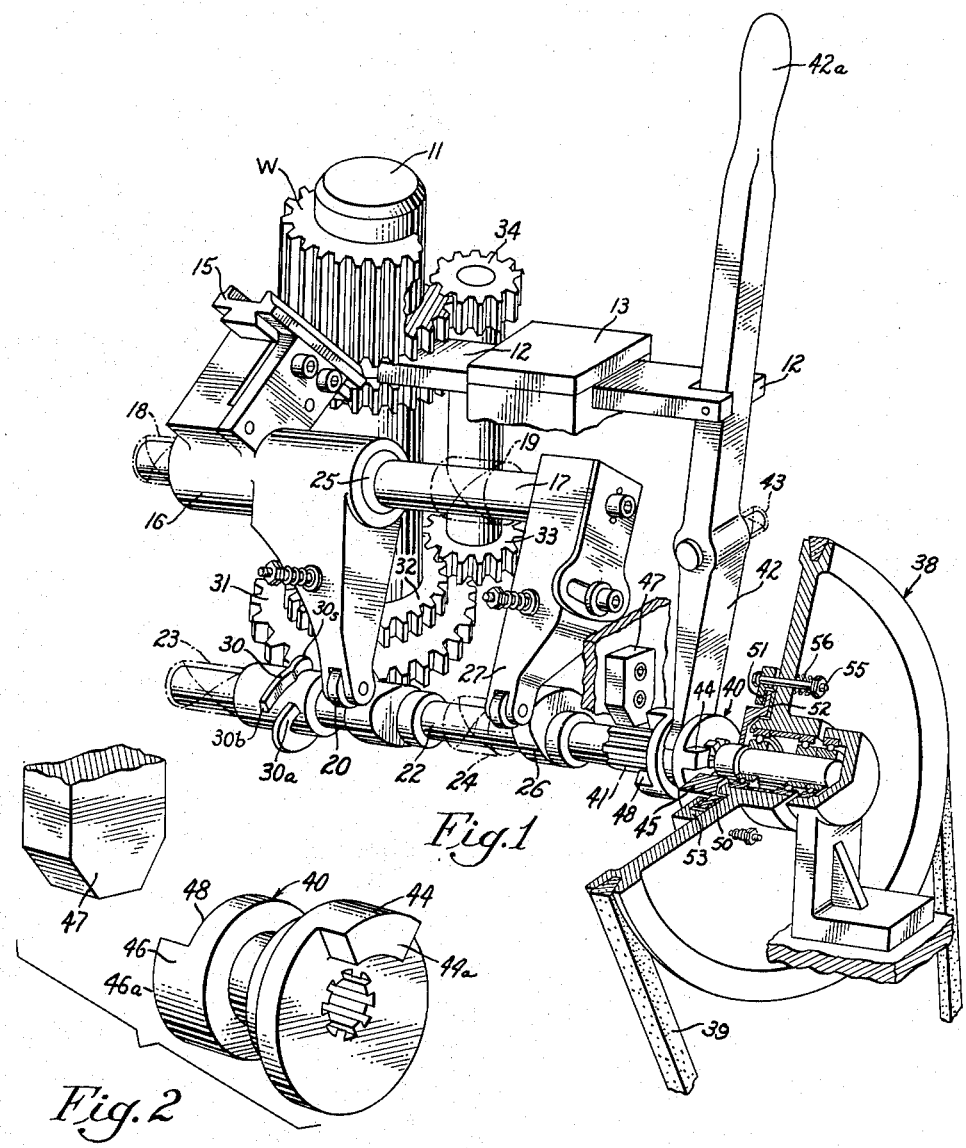
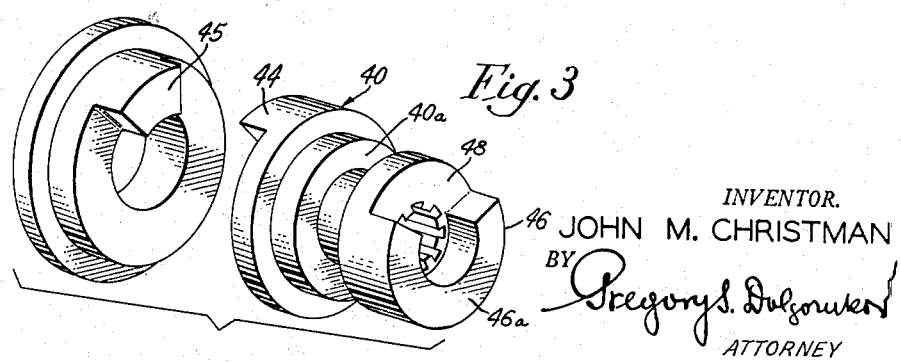
INVENTOR.
JOHN M. CHRISTMAN
BY Gregory S. Dulgoruken
ATTORNEY Jan. 10, 1956  J. M. CHRISTMAN  2,730,019
MACHINE FOR CHAMFERING GEARS AND CLUTCH MEANS THEREOF
Filed June 20, 1951  3 Sheets-Sheet 2

INVENTOR.
JOHN M. CHRISTMAN
BY
Gregory S. Dolgorukov
ATTORNEY

INVENTOR.
JOHN M. CHRISTMAN
BY Gregory S. Dolgorukov
ATTORNEY

United States Patent Office 2,730,019
Patented Jan. 10, 1956

2,730,019

MACHINE FOR CHAMFERING GEARS AND CLUTCH MEANS THEREOF

John M. Christman, Grosse Pointe Woods, Mich.

Application June 20, 1951, Serial No. 232,630

11 Claims. (Cl. 90—1.4)

This invention relates to gear-chamfering and similar machines, and more particularly to an improved machine of such nature including an improved clutch mechanism. The present application is a continuation-in-part of my co-pending application, Serial No. 137,420, filed on January 7, 1950, Patent No. 2,668,480, February 9, 1954, for Method and Means for Burring or Chamfering Gears.

In utilizing machines of the above general nature, and particularly in stopping them for loading and unloading, it was found desirable, and in many cases necessary, to provide therein clutch means adapted to stop some moving part of the machine, such as its cutting tool, without stopping the motor of the machine. Provision of conventional clutches for such purposes proved to be totally impracticable in such applications. In machines of this general nature it is often necessary to stop the moving part, such as the movable cutting tool, in a certain predetermined position. Such a requirement means that no matter at what point of the movement cycle of such part or tool the drive is disconnected, such part must continue to move until the desired position is reached, but not move beyond it. Failure of a machine to operate in such a manner produces various functional difficulties and often makes the machine inoperative for the purposes intended.

In gear-chamfering machines, for instance, it is required to stop the chamfering tool in a position to clear the work, i. e., the chamfered gear, for reloading the machine. If the tool is stopped while it is still in contact with the work or has not otherwise cleared it, removal of the chamfered gear from the machine and inserting a new gear therein for chamfering may not be possible. On the other hand, in view of very rapid movements of the chamfering tool, such as 5 complete motion cycles per second, it is not physically possible for the machine operator to watch the cutting tool and to attempt stopping it in a desired position. With the attempted use of conventional clutches, both of the friction type and the positive or jaw type, it was found that in many instances as the clutch is disengaged, the tool is about to begin a new cycle, and the inertia of the moving parts of the machine is insufficient to overcome the frictional resistance of the machine, and the tool may stop in a position of intereference with the chamfered gear. Obviously, provision of a heavier flywheel or otherwise increasing inertia of the moving parts of the machine does not solve the above difficulty, since even if the inertia of the machine is made capable to carry the tool through a greater number of cycles, the point of stopping of the tool within a cycle remains just as indefinite and unpredictable as before.

One of the main objects of the present invention is to provide an improved machine of the foregoing nature and a clutch mechanism therefor, whereby the above difficulties and disadvantages are overcome and largely eliminated, and the cutting tool or other moving part of such a machine always stops within a predetermined portion of its motion cycle.

Another object of the present invention is to provide an improved machine including a tool or other part repeatedly movable through a predetermined cycle, means being provided whereby disconnecting of the driving portion of the machine from such tool or part can occur only at a predetermined point or portion of cycle, preferably advanced for a desired distance from the stopping point thereof.

A further object of the invention is to provide a machine of the nature specified in the preceding paragraph, means being provided therein to ensure that there remains sufficient driving connection of a positive nature between the driving portion of the machine and the tool, ensuring that the tool is always brought to the predetermined stopping point and is not left stopped in advance of said point.

A still further object of the invention is to provide an improved machine of the nature specified in the preceding paragraph, means being provided relieving the impact or jar on the machine when the positively driven machine parts reach a positive stop before they are disengaged from the driving portion of the machine.

A still further object of the invention is to provide an improved machine of the foregoing nature, means being provided whereby the clutch-operating means are adapted to release or unlock the work-locating means or work-clamping means in the process of operating the clutch.

A still further object of the present invention is to provide an improved clutch mechanism adapted to be operatively interposed into a machine or device having a driving portion, and driven portion movable through a predetermined cycle, said clutch mechanism being adapted irrespective of the point in the cycle where it is disengaged or disconnected always to carry the driven portion or desired part thereof to a predetermined stopping point in said cycle, and to stop such driven portion or part at said stopping point without overtravel and yet without jarring the machine or imposing undesirable impact stresses thereon which a sudden stop would produce.

It is an added object of the present invention to provide an improved machine and clutch therefor of the foregoing nature, which are simple and rugged in construction, dependable in operation, and relatively inexpensive to manufacture.

Further objects and advantages of the present invention will be apparent from the following description and appended claims, references being had to the accompanying drawings forming a part of this specification, wherein like reference characters designate corresponding parts in the several views.

Fig. 1 is a perspective view illustrating a gear chamfering machine and a clutch mechanism therefor, embodying the present invention.

Fig. 2 is an exploded perspective view of the positive clutch member and the stop therefor, the observer looking thereon from the same angle as in Fig. 1, i. e., from the right end of the machine.

Fig. 3 is an exploded perspective view of the positive clutch member and of the part of the articulated driving wheel, the observer looking thereon from the left end of the machine.

Figure 4:
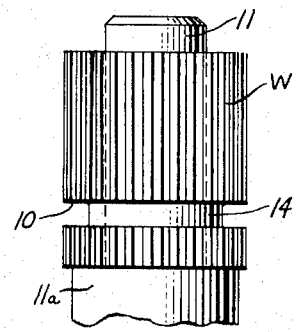
Fig. 4 is an elevational view of the work, i. e., the gear to be chamfered, in the machine.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

In accordance with the invention I provide in a gear chamfering machine having a reciprocating cutter, a positive clutch mechanism adapted to stop the cutter in its fully withdrawn position, thus eliminating possible interference of the cutter with removal of the gear from the machine and insertion of another gear therein. Stopping of the cutter at said position is attained by providing a stop adapted to be engaged by a clutch member constantly connected to the driven portion of the machine, only at a position thereof corresponding to the desired stopping position of the cutter.

In addition, I provide a yielding, preferably frictional connection within the driving portion of the machine adapted to permit an overrun of such driving portion should the positive clutch mechanism hit the stop while still connected to the driving portion of the machine, and thus cushioning the impact which might otherwise jar the machine. This feature is of importance in both engaging and disengaging of the positive clutch mechanism.

In the drawings there is shown by way of example a machine and clutch means therefore, embodying the present invention. The machine illustrated in the drawings is a gear-chamfering machine, and with the exception of the improvements herein disclosed it is described in detail in my said co-pending application Serial No. 137,420. Therefore, for the purpose of clarity only as much of the machine is illustrated and described herein in detail as is necessary for understanding of the present invention.

The machine is adapted to chamfer the end edges of the gear teeth at the inner face 10 of the gear shown in Fig. 4. Sinc the face to be chamfered is an intermediate face, means are provided to locate the gear from said face, rather than from one of its extreme faces, thus avoiding variation in the chamfer of gears due to permissible variation in machining.

Figure 5:
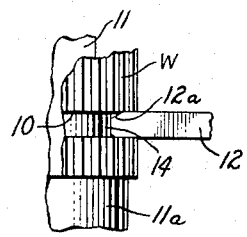
Fig. 5 shows the end of the sliding work-locating plate.

The machine includes means to receive the gear W and to locate it radially and axially. Radial locating means are in the form of an arbor 11 on which the gear is placed as illustrated, a stop 11a being provided to locate the gear axially in a preliminary manner by supporting it in a position where the locating plate 12 having a chamfered end 12a (see Fig. 5) and slidably mounted in a support 13 may engage the slot 14 of the gear and thus finally locate it from the face 10 for chamfering. In cases where a gear is to be chamfered at one of its extreme faces, no slidable locating plate such as 12 is necessary, and such gear is merely placed on the arbor with its face to be chamfered against an axial stop. No clamping or locking means are necessary under such conditions, since as disclosed in my said prior application the cutter will press the work toward the stop and will not disturb its position.

A reciprocating chamfering cutter 15 is secured to a cam-operated bracket 16 mounted for rocking movements on a shaft 17 journaled in suitable bearings omitted for the sake of clarity of the drawing but indicated at 18 and 19. The follower end of the bracket 16 carries a roller 20 and is operated with the aid of a cam 21 provided on a shaft 22 mounted in bearings indicated at 23 and 24.

Means are provided to raise and to lower the cutter bracket 16 bodily and thus to bring the cutter 15 in a cutting position for its working stroke and to relieve it from contact with the work for withdrawal or return stroke. Said means are exemplified by an eccentric member 25 provided on the shaft 17 and adapted to raise and to lower said bracket as the shaft 17 rotates in a reciprocating manner through a predetermined angle, such as 20 degrees. Such rotation of the shaft 17 is effected with the aid of a cam 26 operating to rock the lower end of a bracket 27 mounted on the shaft 17. By virtue of such a construction the working edge of the cutter 15 is caused to move along a closed path illustrated in Fig. 6, which path constitutes the motion cycle through which said edge is repeatedly moved.

Means are provided to rotate the gear W intermittently in order to maintain or keep said gear fixed in one position while the chamfering is actually taking place at said position, and to rotate it to the next position after chamfering operation at the previous position has been completed and the cutter 15 is withdrawn to its fully retracted position. Such means do not form a part of the present invention, and are described in detail and claimed in my said co-pending application. For the purpose of explaining the present invention it will suffice to state that said means include a variable angle worm 30 provided on the shaft 22 and having a straight middle portion 30s and helical ends 30a and 30b spaced to engage one tooth of a gear 31 after another. A gear 32 provided on the same shaft with the gear 31 meshes through gears 33 and 34 with the work gear W for intermittently rotating the same.

The machine is driven by an electric motor (not shown), or a similar source of mechanical power, with the aid of a belt 39 engaging an articulated flywheel pulley generally designated by the numeral 38.

It will now be clear in view of the foregoing that when the entire machine of this general nature is stopped, or when conventional clutch means disconnecting the cutter from the driving portion of the machine are used, the cutter may stop anywhere within its cycle of motion. Therefore, should the cutter stop, for instance, during its cutting action, removal of the gear for reloading of the machine will not be possible until the cutter is made to clear the gear.

In accordance with the invention means are provided whereby disconnecting or disengaging the cutter 15 from the driving portion of the machine always brings the cutter into a position clearing the gear W. In the present embodiment of the invention said means are exemplified by a positive clutch adapted to make and to brake positive driving connection or engagement between the flywheel pulley 38 and the driven shaft 22. Said clutch means comprise a clutch member generally designated by the numeral 40 and drivingly mounted for axial sliding on the splined portion 41 of the shaft 22. The middle portion of said member 40 is recessed as at 40a for receiving the end of the clutch-operating hand lever 42 pivoted at 43, which lever also operates the sliding locating plate 12.

Figure 6:
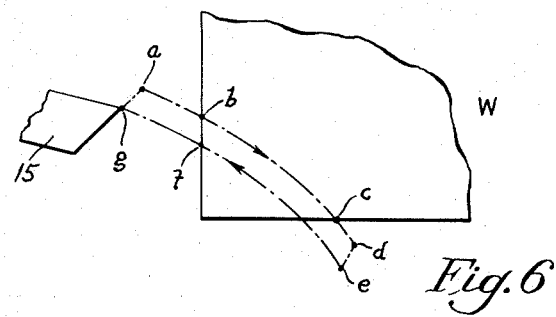
Fig. 6 is a diagram showing the motion cycle of the cutting edge of the chamfering cutter with relation to the edge to be chamfered.

Referring to Fig. 6 the line a—d represents the working stroke of the cutter edge, the portion b—c of said line indicating the portion of said stroke where actual cutting takes place. The line d—e indicates the relieving movement of the cutter effected by the above described eccentric means. The line e—g represents the return or withdrawing stroke of the cutter to its fully retracted position; and the line g—a indicates movement of the cutter from relieved position to cutting position. Movements of the cutter edge through the positions b—c—d—e—f occur substantially while the gear 31 is engaged by the straight portion 30s of the worm 30 and the gear W is held stationary. Rotation at the gear W or "indexing" thereof occurs during movements of the cutter edge through positions f—g, g—a, a—b, or any portion thereof i. e., when the cutter 15 clears the gear W.

It will now be seen in view of the foregoing that when the chamfering operations on all of the teeth of the gear W are completed, and it becomes necessary to withdraw the gear W for reloading of the machine, the rapidly moving cutter which may operate at a rate of 3 strokes per second, or even faster, must first be stopped. Moreover, the cutter 15 must be stopped in a position to clear the gear W, i. e., within the range of its positions along the lines f—g, g—a, or a—b.

Figure 8:
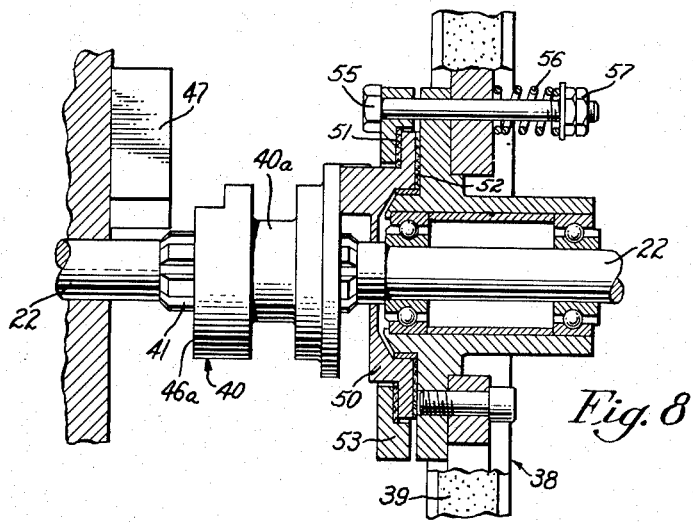
Fig. 8 is a view, partly in section, showing the clutch means fully engaged.

On the driven side of said member 40 there is provided a lug 44 adapted to engage a corresponding lug 45 carried by the articulated flywheel pulley 38. Thus, when the lever handle 42a is pushed all the way to the left, the locating plate 12 enters the slot or recess 14 of the gear W for axially locating the same at the surface to be chamfered, and the member 40 is moved all the way to the right into the position shown in Fig. 8. In said position the driving portion of the machine is in full driving engagement with the driven portion thereof, the latter portion including the driven shaft 22 and the work gear W.

Figure 9:
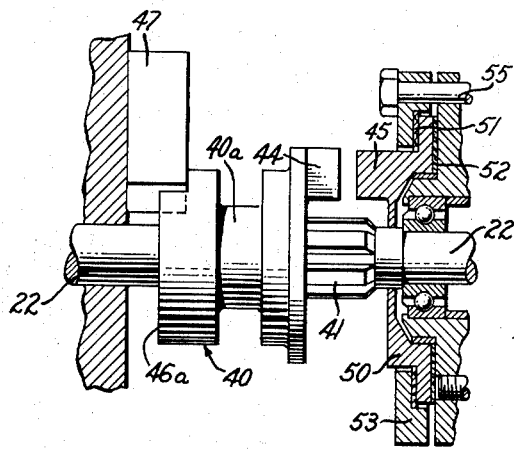
Fig. 9 is a view similar to Fig. 8 and showing the clutch means fully disengaged.

For stopping the cutter, the lever handle 42a is moved all the way to the right to withdraw the plate 12 from the slot 14 and to bring the member into the position shown in Fig. 9, at which position the driven shaft 22 is fully disengaged from the flywheel pulley 38.

Means are provided whereby such disengagement is made possible only at predetermined positions of said member 40, which positions correspond to positions of the cutter 15 at which it clears the gear W.

It will be noted that the angular extent of the recess 48 is considerably larger than that of the stop 47 engaging it, whereby a lost motion connection is thus provided between the clutch member 40 and the stop 47. One of the important functions of such a connection is to counteract the undesirable effect of high angular speed of the clutch member as compared to the axial speed thereof in sliding. By virtue of such a connection sufficient time is given to the member 40 to engage the stop 47 for a desired distance before the opposite face of the recess hits the stop 47. It will now be understood that the angular extent of the recess 48 should be as large as possible, providing however that it does not permit the movements of the cutter 15 beyond the range represented by the lines a—b, f—g, and g—a. Chamfering edges of the non-driving faces of the engaging parts also provide some help in this respect.

Figure 7:
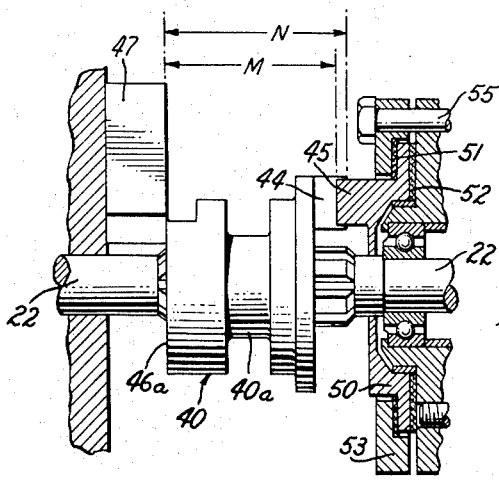
Fig. 7 is a view, partly in section, showing the clutch means in a condition where the positive clutch member is moved against the stop, but before it engages the same positively.

It should be noted that the distance M between the faces of the lug 45 and the stop 47 is smaller than the distance N between the faces 44a and 46a of the member 40. Such a construction, best shown in Fig. 7, has the advantage of ensuring that the member 40 moved toward the stop 47 and rubbing against the stop face with its face 46a does not stop before the recess 48 registers with the stop, whereby the cutter 15 would be stopped in a position of interference with the work gear W. By virtue of such an expedient disengagement of the clutch member 40 from the driving portion of the machine is only partial until the recess 48 registers with the stop 47, and it is completed only after such registry is effected.

Figure 10:
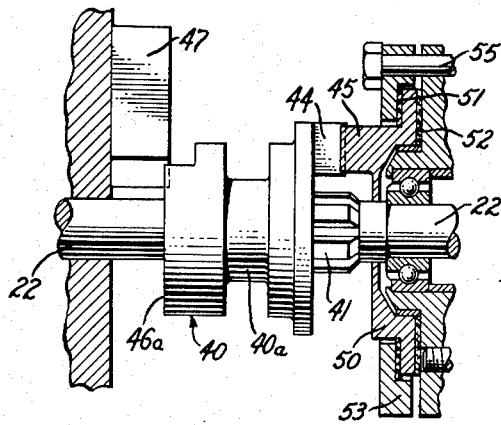
Fig. 10 is a view similar to Figs. 8 and 9 but showing the undesirable but unavoidable condition where the clutch member engaged the stop positively while still positively engaged to the driving portion of the machine.

While serving successfully the above purpose, the above expedient produces on rare occasions an undesirable condition illustrated in Fig. 10, which is, in effect, an overlapping of the clutch member 40 with the stop 47 and the driving lug 45. Under such a condition the member 40 hits with the face of the recess 48 the stop 47 while still being positively engaged or connected to the driving portion of the machine. It should be appreciated that such a condition may occur both in engaging and in disengaging the clutch, and may produce a severe load on the machine, causing breakage.

Means are provided whereby the effect of such undesirable condition is eliminated. Said means may be in the form of any yielding connection provided in the driving portion of the machine. Such a connection may be of a spring type, friction type, pneumatic, etc. In the present embodiment said means are in the form of a friction connection incorporated into the driving portion of the machine, particularly the flywheel pulley 38 thereof. The lug 45, instead of being provided on the body of the pulley 38, is formed on a friction clutch member 50 provided with friction discs 51 and 52 and pressed against the hub 54 of the pulley 38 with the aid of a pressure plate 53. The pressure plate 53 is connected to the pulley 38 with the aid of a plurality of bolts 55 having compression springs 56 provided between the pulley 38 and the washer and nuts 57. The force with which the pressure plate 53 is held against the member 50 and the hub 54 of the pulley is determined by the forces exerted thereon by the springs 56. By tightening the nuts 57 and thus increasing the compression of the springs 56, the forces of the springs 56 may be adjustably increased, thus increasing the torque transmitted by the friction clutch. It will now be seen in view of the foregoing that when positive locking of the position clutch member occurs, such as shown in Fig. 10, the friction clutch slips until such locking, which is usually a phenomenon of only a short duration, is eliminated. The greater is the torque transmitted by the friction clutch, the less sensitive it becomes. The torque transmitted by the friction coupling or connection should be greater than the normal driving torque in the machine.

While the present invention has been illustrated and described with reference to a gear-chamfering machine, it will be understood that it is applicable to other machines wherein similar problems are encountered.

By virtue of providing the above disclosed machine and clutch means therefor, the objects of the present invention listed above and numerous additional advantages are attained.

I claim:

1. In a machine for chamfering gears, a cutter movable through a predetermined cycle of motions, rotating driving means for said cutter adapted to cause completion of the cutter motion cycle in one revolution, positive clutch means adapted to connect said driving means to said cutter for driving the same and to disconnect said driving means therefrom, stop means engageable by said clutch means when said clutch means are moved into the position for disconnecting the driving means from the cutter, said stop means being engageable by said clutch means only within a predetermined portion of the rotating cycle thereof corresponding to predetermined positions of said cutter in the motion cycle thereof, said clutch means being movable at any of their rotative positions from their full engagement with said driving means.

2. In a machine for chamfering gears, a cutter movable through a predetermined cycle of motions, rotating driving means for said cutter adapted to complete the motion cycle thereof in one revolution, positive clutch means adapted to connect said driving means to said cutter for driving the same and to disconnect said driving means therefrom, stop means engageable by said clutch means when said clutch means are moved into the position for disconnecting the driving means from the cutter, said stop means engageable by the clutch means only within a predetermined portion of the rotating cycle thereof corresponding to predetermined positions of said cutter in the motion cycle thereof, said clutch means being movable at any of their rotative positions from their full engagement with said driving means and lost motion means providing predetermined lost motion between said clutch means and said stop.

3. In a machine for chamfering gears, a cutter movable through a predetermined cycle of motions, rotating driving means for said cutter adapted to complete the motion cycle thereof in one revolution, positive clutch means adapted to connect said driving means to said cutter for driving the same and to disconnect said driving means therefrom, stop means engageable by said clutch means when said clutch means are moved into the position for disconnecting the driving means from the cutter, said stop means being engageable by said clutch means only within a predetermined portion of the rotating cycle thereof corresponding to predetermined positions of said cutter in the motion cycle thereof, said clutch means being movable at any of their rotative positions from their full engagement with said driving means and lost motion means providing predetermined lost motion between said clutch means and said stop, friction coupling means operatively interposed in said driving means and adapted to yield to inertia loads on the machine resulting from engaging and disengaging of said clutch means.

4. In a machine for chamfering gears, fixture means adapted to receive a gear to be chamfered, means adapted to locate said gear in said fixture means for chamfering, a cutter movable through a predetermined cycle of motions, rotatable shaft adapted to actuate said cutter, positive clutch means adapted to connect said shaft to said cutter for driving the same and to disconnect said shaft therefrom, stop means engageable by said clutch means when said clutch means are moved into the position to disconnect said shaft from the cutter, said stop means being engageable by said clutch means only in the positions of said clutch means corresponding to retracted positions of the cutter, said clutch means being movable at any of their rotative positions from their full engagement with said driving means, lost motion means between said clutch means in said cutter, said lost motion means accommodating movements of the cutter substantially within the range of retracted positions thereof, friction connecting means operative interposed in said driving means and adapted to slip under loads imposed on the machine in operation due to partial locking thereof in the process of connecting and disconnecting said driving means and manual means for operating said clutch means and adapted to operate said gear locating means.

5. A clutch mechanism adapted to drive a rotatable shaft and to stop said shaft in a predetermined angular position within the 360 degree range of its rotation, said clutch comprising a member mounted drivingly and slidably on said shaft, drive-engaging means on one end of said member adapted to effect a driving connection of said member with driving means, positive stop-engaging means provided on the other end of said member and adapted to engage a motionless stop but only within a predetermined portion of the rotative cycle for stopping said member and said shaft in a predetermined angular position thereof, and means to slide said member on said shaft from the position of full engagement with the driving means to full engagement with said stop and out of the engagement with the driving means, and thereupon out of the engagement with said stop, said member being adapted at any of its positions within the range of its rotation to be moved from its full engagement with said driving means toward said stop.

6. A clutch mechanism adapted to drive a rotatable shaft and to stop said shaft in a predetermined angular position within the 360 degree range of its rotation, said clutch comprising a member mounted drivingly and slidably on said shaft, driving-engaging means on one end of said member adapted to effect a driving connection of said member with driving means, positive stop-engaging means provided on the other end of said member and adapted to engage a motionless stop only within predetermined portion of the rotative cycle for stopping said member and said shaft in a predetermined angular position thereof, and means to slide said member on said shaft from the position of full engagement with the driving means to full engagement with said stop and out of the engagement with the driving means, and thereupon out of the engagement with said stop, said member being adapted at any of its positions within the range of its rotation to be moved from its full engagement with said driving means toward said stop the positive engagement of the stop by said means including a lost motion means to decrease the possibility of positive locking of said driving means to said stop through said member at high speeds.

7. A clutch mechanism adapted to drive a rotatable shaft and to stop said shaft in a predetermined angular position thereof within the 360 degree range of its rotation, said clutch comprising a member slidably mounted on said rotatable shaft and drivingly connected thereto, drive-engaging means provided on one end of said member and adapted to effect a driving connection with driving means when said member is slid into the engagement therewith, positive stop-engaging means provided on the other end of said member and adapted within a predetermined portion of its rotative cycle to engage a motionless stop for stopping said member and said shaft in a predetermined angular position, and manually controlled means for sliding said member on said shaft from the position of full engagement with the driving means into a position of engagement with said stop and out of the engagement with said driving means, said member being adapted at any of its positions within the range of its rotation to be moved from its full engagement with said driving means toward said stop.

8. The construction defined in claim 7, the stop and the stop-engaging means being in the form of a tooth and a recess cooperating therewith.

9. The construction defined in claim 7, the stop-engaging means on said member being in the form of a smooth face adapted to slip on the stop without positively engaging it, and a recess on said face adapted to engage said stop when registering with same.

10. The construction specified in claim 6 and including a yielding driving connection between said member and the driving means, said connection being yieldable in both directions of rotation.

11. The construction specified in claim 6 and including frictional driving connection operatively interposed between said member and the driving means.

References Cited in the file of this patent

UNITED STATES PATENTS

| 321,656 | Stolterfoht | July 7, 1885 |
|---|---|---|
| 600,264 | Higgins | Mar. 8, 1898 |
| 921,628 | Platter | May 11, 1909 |
| 1,153,831 | Slentz | Sept. 14, 1915 |
| 1,281,121 | Bates | Oct. 8, 1918 |
| 2,265,133 | Gollwitzer | Dec. 9, 1941 |
| 2,379,992 | Sasgen | July 10, 1945 |
| 2,623,618 | Howard | Dec. 30, 1952 |

FOREIGN PATENTS

| 155,662 | Germany | Nov. 17, 1904 |